(12) United States Patent
Kwok

(10) Patent No.: US 7,123,317 B2
(45) Date of Patent: Oct. 17, 2006

(54) LIQUID CRYSTAL DISPLAY WITH FLUORESCENT MATERIAL

(75) Inventor: Joseph Tak Ming Kwok, Hong Kong (CN)

(73) Assignee: Monerey International, Ltd., Hunghom (CN)

( * ) Notice: Subject to any disclaimer, the term of this patent is extended or adjusted under 35 U.S.C. 154(b) by 15 days.

(21) Appl. No.: 10/686,363

(22) Filed: Oct. 14, 2003

(65) Prior Publication Data

US 2005/0078236 A1   Apr. 14, 2005

(51) Int. Cl.
*G02F 1/1335*   (2006.01)

(52) U.S. Cl. ............... 349/71; 349/70; 362/84

(58) Field of Classification Search ............ 349/70–71, 349/96, 113, 114; 362/84
See application file for complete search history.

(56) References Cited

U.S. PATENT DOCUMENTS

| | | | | |
|---|---|---|---|---|
| 4,521,775 A | * | 6/1985 | Noble | 345/4 |
| 5,076,668 A | * | 12/1991 | Dalisa et al. | 349/86 |
| 5,680,188 A | * | 10/1997 | Yoshida et al. | 349/113 |
| 5,815,228 A | * | 9/1998 | Flynn | 349/71 |
| 6,124,971 A | * | 9/2000 | Ouderkirk et al. | 359/487 |
| 6,147,934 A | * | 11/2000 | Arikawa et al. | 368/84 |
| 2004/0137224 A1 | * | 7/2004 | Kusumoto et al. | 428/350 |

* cited by examiner

*Primary Examiner*—Huyen Ngo
*Assistant Examiner*—(Nancy) Thanh-Nhan Phan Nguyen
(74) *Attorney, Agent, or Firm*—Donald N. MacIntosh

(57) ABSTRACT

A liquid crystal display device such as a clock which is battery operated has enhanced color for its pixels under ambient light by the use of a fluorescent layer on the reflective backing of the display.

6 Claims, 1 Drawing Sheet

LIQUID CRYSTAL DISPLAY WITH FLUORESCENT MATERIAL

FIELD OF THE INVENTION

The present invention is directed to liquid crystal display apparatus with an enhanced color display especially suitable for digital clocks.

BACKGROUND OF THE INVENTION

Optical displays using liquid crystal technology have been widely used in products ranging from small devices such as clocks, watches, calculators, portable phones (all of which are normally battery powered) to larger items such as computers and television receivers. Enhancing display contrasts and providing vivid colors and brightness has been an objective of designers. Where power is obtained from a non-battery source (and is therefore unlimited) continuous backlighting is used; in battery powered devices such an approach would quickly drain all battery power.

Several approaches have been used to introduce colors to a display that works under ambient light (back lighting is used only intermittently) and where a battery is used. One is to add a color filter to a front polarizer which allows the unwanted other color components to be absorbed in addition to the light of unwanted polarization. Thus, in a so called positive mode of operation the display pixels show the color of the filter but the background will carry and undesirable tinge of the color on a silvery background which results in poorer contrast.

Another technique is placing a color filter between the rear polarizer and reflector. This allows more incident light to go through the liquid crystal assembly but only a fraction of this light is reflected to the observer on the return trip again resulting in poor contrast.

Lastly, the display contrast may be worsened due to the typical time division multiplexing driving of the pixels. This is normally used to obtain high pixel counts for a fixed number of drivers. As a result, the light available to the liquid crystal display will be limited to a fraction depending on the duty cycle used (usually a small fraction) While not a problem for non-color displays, it is for color.

OBJECT AND SUMMARY OF THE INVENTION

It is a general object of the present invention to provide a liquid crystal display apparatus with an enhanced color display.

It is a further object of the invention to provide a color display where the colors are more visible and displayed with better contrast under both ambient and backlight conditions in both positive and negative operating modes.

In accordance with the above objects there is provided a liquid crystal display apparatus having a liquid crystal assembly including liquid crystal material sandwiched between a pair of transparent plates which carry patterned electrodes which provide the desired liquid crystal display. The apparatus further includes front and rear polarizing layers having transmissive axes either aligned or rotated with respect to each other and further including a reflector for reflecting ambient incident light on the front layer back through the rear polarizing layer and the liquid crystal assembly and the front polarizing layer to a viewer. The improvement comprises a layer including fluorescent material between the rear polarizing layer and the reflector responsive to the ambient incident light to emit a specific wavelength to provide color for the display.

DETAILED DESCRIPTION OF THE PREFERRED EMBODIMENTS

Figure 1:
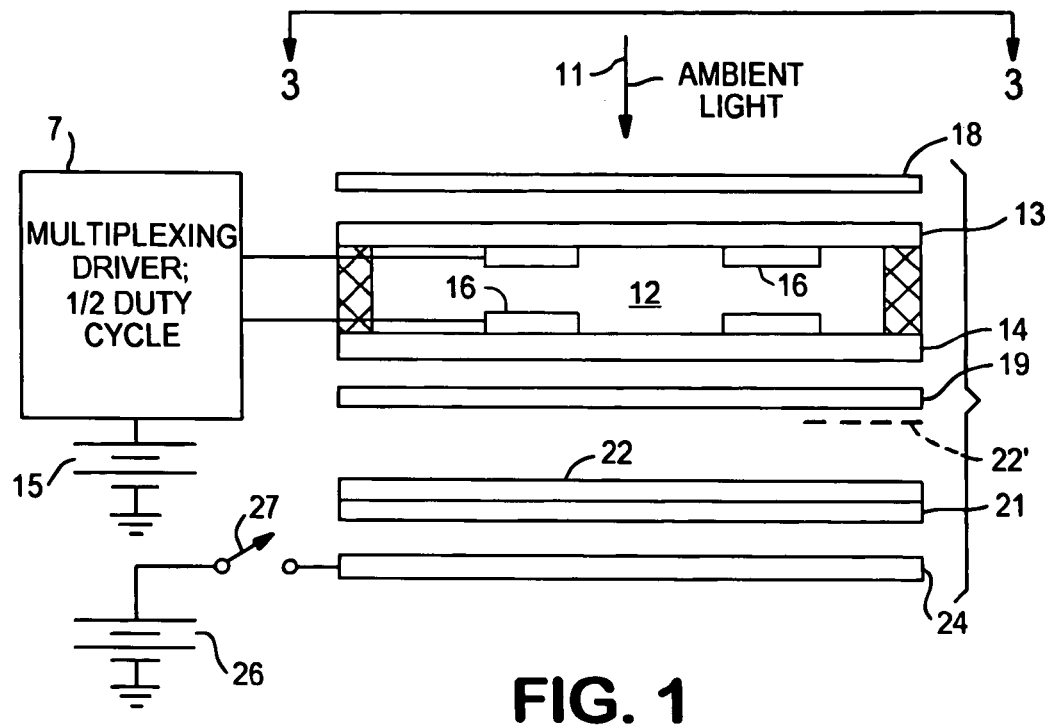
FIG. 1 is an exploded side view of one embodiment of the invention.
Figure 3:
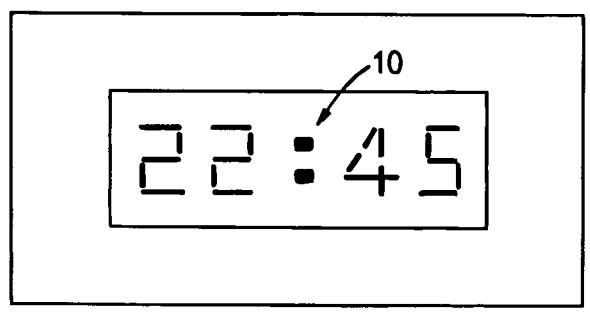
FIG. 3 is a plan view showing a liquid crystal display taken along the line 3—3 of FIG. 1.

FIG. 1 shows an exploded liquid crystal display (LCD) apparatus which as illustrated in FIG. 3 is part of a clock having the digital LCD segments 10 indicating the time of 22:45. As will be discussed in detail below in one mode (the negative) the segments will have a specific color on a black background. The user views the clock and its display in the same direction as the ambient light shown by arrow 11 in FIG. 1.

DETAILED DESCRIPTION OF THE INVENTION

FIG. 1 shows an exploded liquid crystal display (LCD) apparatus which as illustrated in FIG. 3 is part of a clock having the digital LCD segments 10 indicating the time of 22:45. As will be discussed in detail below, in one mode (the negative) the segments will have a specific color on a black background. The user views the clock and its display in the same direction as the ambient light shown by arrow 11 in FIG. 1.

Referring back to FIG. 1 the liquid crystal assembly consists of a layer 12 of liquid crystal material sandwiched between a pair of transparent plates 13, 14 typically of glass which carry patterned electrodes 16 made of indium tin oxide; these when activated by a multiplexed voltage from driver 17 rearrange or realign the crystals between the electrodes to block or allow the transmission of light (depending on whether a positive or negative mode of operation is being used) thus providing the desired digital display.

A front polarizing layer 18 is attached to the visible side of plate or substrate 13 and a rear polarizing layer 19 to bottom plate or substrate 14. The two polarizing layers 18, 19 have transmission axes either aligned or rotated up to 90 degrees. A reflector 21 will return any light transmitted to it back through the above assembly.

Thus far as described, the foregoing is a standard LCD device. And in operation the polarizers allow only light of one polarization to pass through while the orthogonal direction of the light components are absorbed. Light emerging from the front polarizing layer 13 undergoes a 90° shift or twist in polarization due to the inherent nature of the liquid crystal layer 12. If the rear polarizing layer 14 is aligned so that its transmission axis is orthogonal with the front polarizer, then light can pass through completely and be reflected by reflector 21. If the reflector is a silvery sheet of aluminum, the display will appear silvery in background. If then a voltage is applied to the electrodes, the liquid crystals under the electrodes will be realigned resulting in no 90° shift and thus light will be absorbed by the front polarizer resulting in black pixels. In this case the display is said to operate in the positive mode. Alternatively, if the rear polarizer has its polarization in parallel with the front polarizer, light emerging from the non electrode portion of the liquid crystal layer will be absorbed causing a black background. When a voltage is applied to the electrodes light will pass through creating silvery pixels; this is the negative mode of operation.

In both of these modes, light energy is absorbed in the polarizers and as a result, only a fraction of the incident light is reflected back to the observer resulting in a darker display background in the positive mode or dimmer pixels in the negative display mode. Also if backlighting is used such an assembly with a diffuser randomizes the incident light to the reflector (which in this case would be translucent). Thus, part of the light will be absorbed by the rear polarizer on the way back to the observer reducing brightness further.

The Enhanced Color Display

Referring still to FIG. 1 on the visible side of reflector 21 is printed a layer 22 of fluorescent material. Its color is chosen by the user for the best spectral conversion efficiency for a particular application. For example, Rodamine red and Rodamine yellow dyes will produce reddish and yellowish colors for the digits 10 (FIG. 3). Fluorescent materials are ideal for this application when excited by the incoming ambient light there is a spontaneous relaxation of the excited electrons to the ground state with a frequency shift (generally longer wavelength) resulting in an intensifying effect at the fluorescing frequency. In contrast, phosphors have a very long decay time and cannot replace fluorescent materials. However they are useful in combination to provide an afterglow at night when temporary backlighting is used. Thus layer 22 may also include phosphorescent material.

In operation light passing through the front polarizing layer and the liquid crystal layer encounters the rear polarizing layer. If the electrodes are activated and the transmission axes of the polarizers adjusted for the proper mode, light will impinge upon and activate the fluorescent layer and provide a digital color display on a black background. This occurs with operation in a negative mode. Also, of course, in a positive mode a color background occurs with black pixels. The required color of the desired wavelength will be magnified through the absorption of light of unwanted wavelengths. This light energy will be reflected by the highly polished face of reflector 21. Such reflector may be composed of translucent material such as a white plastic sheet or a white paper sheet. When backlighting is required, an electroluminescent plate 24 may be used powered by an electroluminance driver circuit connected to the battery 26 through switch 27. A minimum amount of light is required because of the use of a translucent reflector. Of course since the LCD device is normally only battery powered as illustrated by battery 15 to driver 17, use of backlighting should only be intermittent.

Figure 2:
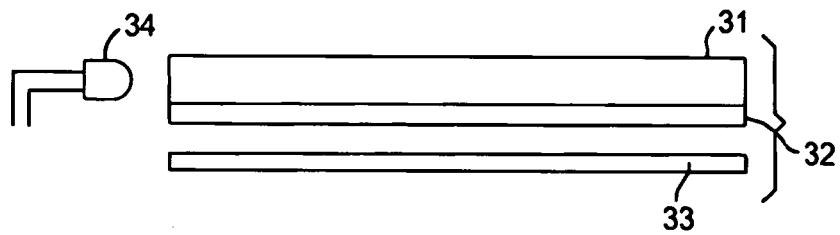
FIG. 2 is an exploded side view of another embodiment which is a partial modification of FIG. 1.

FIG. 2 is an alternative backlight using a light cavity on a diffusing sheet 32 and a reflector 33 all of which are illuminated by light source 34. This replaces plate 24 of FIG. 1.

The fluorescent layer 22 may also be attached at 22' to the underside of polarizing layer 19. It can be formed of a single layer of one color or a combination of patches of various colors.

The rear polarizing layer 19 may also be a reflective polarizer film such as manufactured by the 3M Corporation under the trademark RDF-C or a double brightness enhancement polarizing film under the trademark DBEF by 3M.

As shown in FIG. 1, the driver 17 should have a duty cycle of at least ½. Any duty cycle less such as ¼ will reduce the light contrast undesirably. This is due to less amount of light impinging onto the reflective layer under each pixel element.

In conclusion an LCD device which is battery operated has been proved with enhanced color.

What is claimed is:

1. In a liquid crystal display apparatus having a liquid crystal assembly including liquid crystal material sandwiched between a pair of transparent plates which carry patterned electrodes which provide the desired liquid crystal display segments, the display apparatus further including front and rear polarizing layers having transmission axes aligned or rotated with respect to each other and further including a reflector for reflecting ambient incident light on said front layer back through said rear polarizing layer and said liquid crystal assembly and said front polarizing layer to a viewer said apparatus having either positive or negative operating modes the improvement comprising;

a layer including fluorescent material between said rear polarizing layer and said reflector responsive to said ambient incident light to emit a specific wavelength to provide a specific color in said negative operating mode for said display segments.

2. In a display apparatus as in claim 1 where said fluorescent layer also includes phosphorescent material.

3. In a display apparatus as in claim 1 including a multiplexing driver for driving said patterned electrodes with a duty cycle of at least ½.

4. In a display apparatus as in claim 1 where said fluorescent layer is printed on said reflector.

5. In a display apparatus as in claim 1 where said reflector is composed of one of the following: translucent material, a white plastic sheet, or a white paper sheet.

6. In a display apparatus as in claim 1 where said rear polarizing layer is composed of one of the following: a reflective polarizer film or a double brightness enhancement polarizer.

* * * * *